Nov. 16, 1937.   H. A. LEONHAUSER   2,099,491
RENEWABLE AND SELF LUBRICATING TROLLEY SHOE
Filed July 24, 1933
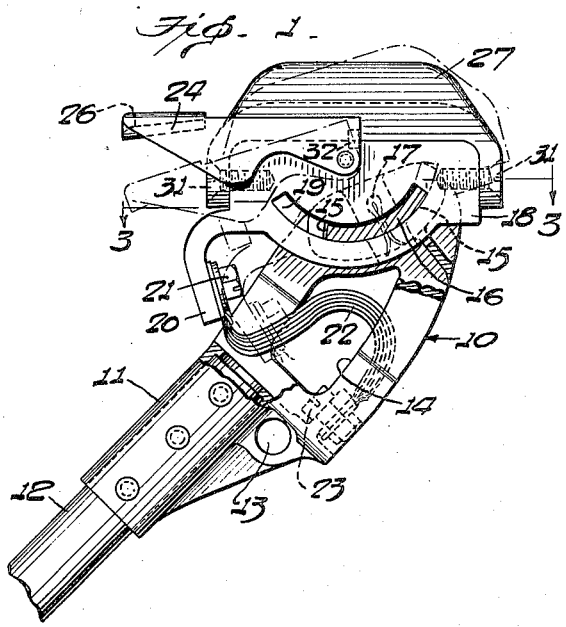
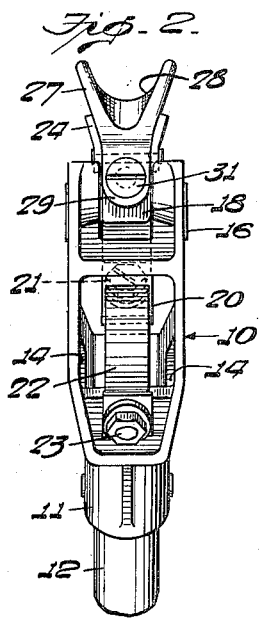
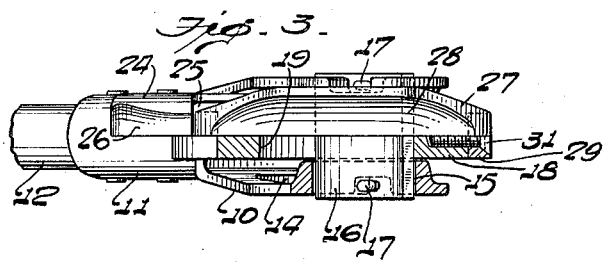
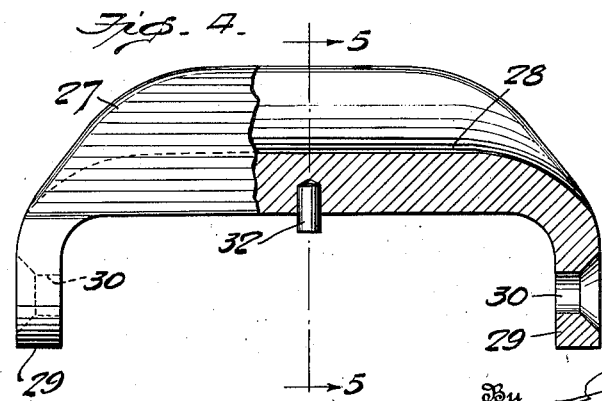
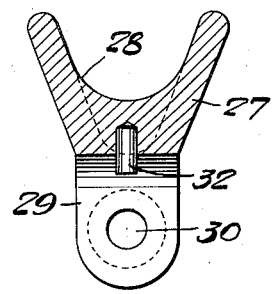
Inventor
Henry A. Leonhauser
By Ernest P. Mechlin
Attorney Patented Nov. 16, 1937

2,099,491

UNITED STATES PATENT OFFICE 2,099,491

RENEWABLE AND SELF-LUBRICATING TROLLEY SHOE

Henry A. Leonhauser, Baltimore, Md., assignor, by direct and mesne assignments, to The Ohio Brass Company, Mansfield, Ohio, a corporation of New Jersey Application July 24, 1933, Serial No. 681,977

3 Claims. (Cl. 191—59.1)

The invention relates to current collectors for urban and interurban trolley cars.

It is well known that for many years it has been the usual practice to employ trolley wheels in rolling engagement with trolley wires for the purpose of collecting current and transmitting it to the motors of electric railway cars. Such wheels give rise to a considerable amount of noise and it has therefore been proposed to provide sliding contact means instead of the rolling contact. However, an objection to the use of a sliding contact shoe is the necessity for lubricating the trolley wire in order to reduce wear on the shoe, as well as the wire, as the result of friction. The common expedient resorted to for effecting such lubrication is to apply grease directly upon a trolley wire, this being done by means of a work car equipped with a suitable grease gun and sent out over the lines at slack times. This method has many objections, a serious one being the fact that the grease melts, especially in warm weather, and drips from the trolley wire, often falling upon and ruining the clothing of pedestrians. In addition, the dripping off of the grease may leave the wire with an insufficient supply. In some instances it has also been proposed to provide a trolley device equipped with an oil reservoir and a wick or other swab for lubricating the trolley wire as the car passes along. This method is probably preferable to that first mentioned but there is the disadvantage that such reservoirs require frequent attention for refilling purposes and replacement of the wicks or swabs.

It is with the above facts in view that I have devised the present invention which has for its general object the provision of a trolley shoe of the sliding contact type constructed of such material as to be self-lubricating, thereby avoiding all the objections present in the use of the well known types of devices.

An important object of the invention is to provide a trolley shoe of the sliding contact type formed of metal in the nature of an alloy containing an ingredient having lubricating properties so that efficient lubrication between the contacting surfaces will be obtained without any necessity for the employment of grease or the like.

Another object of the invention is to provide a trolley shoe which is quickly and easily removable and replaceable by a new one when worn beyond a predetermined safe extent, there being naturally an appreciable amount of wear resulting from the frictional engagement of the shoe with the trolley, the wearing away being to a certain extent essential as presenting a fresh surface to the wire so that lubrication will be continuous.

Another object of the invention is to provide a trolley shoe which may be constructed as an attachment to or replacement for already existing trolleys without necessitating any material alterations therein save, perhaps, the provision of tapped holes or the like for receiving necessary securing elements.

An additional object of the invention is to provide a device of this character which will be not only substantially noiseless and also efficient as a self-lubricating means, but which will also be simple and inexpensive to make and install, positive in action, durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawing in which:

Figure 1 is a side elevation of the device with parts broken away,

Figure 2 is an end elevation or edge view,

Figure 3 is partially a plan view and partially a horizontal section of the device taken on the line 3—3 of Figure 1, Figure 4 is a view half in side elevation and half in vertical longitudinal section showing the shoe detached, Figure 5 is a cross section taken on the line 5—5 of Figure 4.

Referring more particularly to the drawing, the numeral 10 designates the trolley head as a whole, this head comprising a body from which extends a socket 11 receiving and appropriately secured to the trolley pole 12. The head is provided with the usual opening 13 which is provided for the purpose of attachment of the usual pull-down rope, not shown. The head 10 is bifurcated or of clevis-like form and may be of any desired or suitable shape, the opposite sides being shown as formed with openings 14 for the purpose of reducing the weight. The end portions of the opposite sides of the head are here disclosed as formed with segmental shaped openings 15 through which extends a correspondingly shaped bearing plate 16 which may be prevented from longitudinal displacement in any desired manner for instance as by means of cotter pins 17. The above described parts constitute the relatively stationary portion of the head upon which is movably mounted the entire shoe assembly to be described.

The entire shoe assembly comprises a body member 18 located within the bifurcation of or between the sides of the head 10, this member being formed with an arcuate or segmental slot 19 through which the bearing plate 16 extends, the slot 19 being of materially greater length or extent than the plate so that the shoe assembly may have a pivotal movement with respect to the head, the engagement of the curved bearing plate within the slot 19 guiding the movement and confining it to rocking or limited rotary movement. The body 18 is also formed with a depending or angular extension or lug 20 to which is attached at 21 one end of a flexible conductor 22 located within the confines of the head 10 and having its other end fastened as at 23 to the lower portion of the head. The purpose of this flexible conductor is of course to insure positive electrical connection between the movable portion of the device and the relatively fixed portion thereof. The movable portion of the device is also represented as including an auxiliary shoe 24 which is bifurcated at 25 and grooved at 26. This may be integral with the body 18 or a separate piece rigidly secured in straddling relation thereto as shown. As a matter of fact all of the above described parts may be varied within wide limits as they do not constitute the most important part of the invention though they are fully illustrated and described for purposes of explanation and for the sake of clearness.

The real subject matter of the invention consists of or involves the provision of a removable or renewable and self-lubricating wear shoe 27 which is of elongated form grooved or channeled in cross section as clearly shown at 28 in Figure 5 and formed at its ends with depending lugs or extensions 29 apertured at 30 for attaching purposes in a manner to be described. This shoe 27 lies upon the upper surface of the body 18 and between the upstanding sides or within the bifurcation of the auxiliary shoe member 24, the depending extensions or lugs 29 embracing the body 18 or lying against the opposite ends thereof. To secure this shoe in place use may be made of machine or cap screws 31, whichever may be preferred, which pass through the holes 30 and into tapped holes in the end portions of the body 18. Clearly the engagement of the shoe 27 between the sides of the member 24 will prevent any lateral strain and it is of course obvious that endwise displacement is prevented by the engagement of the lugs 29 with the forward and rear ends of the body 18. Upward displacement is prevented by the screws 31. As an additional securing means which will also serve as a guide for properly positioning the shoe, the underside of the shoe may be equipped with a dowel pin 32 seated within a corresponding recess in the top of the body 18 as indicated by dotted lines in Figure 1.

The idea involved is that the removable shoe 27 be constructed of self-lubricating material, quite a number of which are on the market and are commercialized under different trade names. While the actual material may be varied within considerable limits, it is possible to use an alloy consisting, say, of bronze with an appropriate admixture of graphite. Then again, the material may be of a more or less bronze-like nature with an incorporated ingredient giving it considerable porosity, the shoe having its pores saturated with oil which is given off at the surface as the surface is worn away. A great many different alloys possessing lubricating qualities are suitable for the purpose.

The device is used of course in identically the same manner as one unprovided with my renewable shoe 27 formed of a self-lubricating composition. However, my device possesses the great advantage that it obviates the necessity of applying any grease or other lubricant to the trolley wire as the material of the shoe 27 provides for the necessary lubrication without assistance or without the employment of any extraneous means or substances. It is only natural that in the course of time the shoe 27 will wear down as the result of friction between it and the trolley wire. When wear occurs to beyond a certain predetermined extent it is a very simple matter to remove the screws 31 and replace the shoe 27 with a new one. Attention might well be invited to the fact that in accordance with modern requirements efforts are being made to eliminate, as far as possible, the objectionable noises incident to street railway operation. A sliding shoe such as I have devised is clearly much quieter in operation than the old and well known rotary wheel. However, this advantage is of secondary importance as compared with the automatic or self-lubricating feature of the device.

Throughout the foregoing description it will be observed that the shoe referred to may be termed simply a wear piece as it is considered immaterial just what phraseology is employed so long as the meaning is clear. Another point to be considered is that as long as the real invention resides in the provision or use of the self-lubricating material for the purpose of obviating any necessity for greasing trolley wires, it is conceivable that in some types of construction the entire head might be formed of such material and grooved out for sliding contact with the trolley. In other words it would not under all circumstances be necessary to have such a removable wear piece. Moreover, it should be mentioned that while the wear piece or shoe is described as having the spaced depending lugs which are secured to the trolley head by means of screws, such a mode of attachment is not essential as it is easily conceivable that this element may be secured in place by spot welding or other equivalent means. If spot welding is resorted to as the mode of attachment it is apparent that when replacement is necessary a chisel or equivalent tool would be needed to break the weld. These and other changes of a purely mechanical sort will probably suggest themselves to one skilled in the art and it is therefore believed that further explanation will be unnecessary.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. A current collector for electric railway cars, comprising a trolley head including a relatively fixed portion, a relatively movable portion pivoted upon said fixed portion for limited rocking movement forwardly and rearwardly with respect thereto, a shoe mounted on the top of said relatively movable portion and grooved for engagement with a trolley wire, said shoe being formed at its ends with parallel apertured depending lugs engaging against the front and rear ends of said movable portion, and axially alined securing elements passing through said lugs and into said relatively movable portion, said shoe being formed of a metallic alloy containing a lubricating ingredient.

2. A current collector for electric railway cars, comprising a trolley head including a relatively fixed portion formed as a clevis, a relatively movable portion having an arcuate slot extending therethrough, a segmental plate extending across the clevis and slidably engaged within said arcuate slot to define a pivot enabling the movable portion to have limited forward and backward rocking movement, a shoe mounted on the top of said relatively movable portion and grooved for sliding engagement with a trolley wire, said shoe being provided at its ends with depending lugs detachably secured to the forward and rear edges of the movable portion, and an auxiliary shoe having a bifurcated end portion straddling and secured rigidly to said movable member and projecting rearwardly therefrom for engagement with the trolley wire.

3. In a current collector, a trolley pole head, a shoe pivotally mounted on said head for sliding engagement with a trolley wire, and an auxiliary wire engaging contact member rigidly mounted on one end of said shoe.

HENRY A. LEONHAUSER.